United States Patent [19]

Mackie

[11] 4,049,265
[45] Sept. 20, 1977

[54] QUESTION AND ANSWER GAME

[75] Inventor: Thomas Barnet Mackie, Kirkcaldy, Scotland

[73] Assignee: Thomas Salter Limited, Kirkcaldy, Scotland

[21] Appl. No.: 683,626

[22] Filed: May 5, 1976

[30] Foreign Application Priority Data

Oct. 29, 1975 United Kingdom .............. 44588/75

[51] Int. Cl.² .............................................. G09B 3/00
[52] U.S. Cl. .................................... 273/1 R; 35/9 R; 273/120 R
[58] Field of Search .............. 273/1 R, 1 E, 1 M, 120; 35/9 R, 9 B

[56] References Cited

U.S. PATENT DOCUMENTS

| | | | |
|---|---|---|---|
| 1,103,865 | 7/1914 | Caler | 273/120 R |
| 2,236,536 | 4/1941 | Hilton | 273/120 A |
| 2,573,314 | 10/1951 | Palma | 273/120 R X |
| 2,585,099 | 2/1952 | Emmert | 35/9 R |
| 2,866,275 | 12/1958 | Reynolds | 35/9 R |
| 3,048,402 | 8/1962 | Schaper | 273/120 R X |
| 3,498,615 | 3/1970 | Toutoumojis | 273/120 R |
| 3,589,724 | 6/1971 | Barlow et al. | 273/1 R |
| 3,707,778 | 1/1973 | McGourty | 35/9 B |

Primary Examiner—Paul E. Shapiro

[57] ABSTRACT

A toy for playing a question and answer game comprises a housing having a ball inlet and a plurality of ball outlets therein and containing an intermediate chamber into which a ball placed in the ball inlet will roll, the intermediate chamber comprising a flexible belt with a plurality of selectively alignable holes for allowing the ball to leave through one of a plurality of ball exists while closing the remaining exits from each of which exits the ball can roll to one of the ball outlets, knobs mounted on shafts extending into the housing, to which the flexible belt is secured, or a curser fixed to the belt are provided externally of the housing for moving the flexible belt so as to select one of the exits.

7 Claims, 5 Drawing Figures

QUESTION AND ANSWER GAME

BACKGROUND OF THE INVENTION

This invention relates generally to toys, more particularly to toys for playing question and answer games.

SUMMARY OF THE INVENTION

An object of the invention is to provide a toy which enables a question and answer game to be played by one or more people.

The toy according to the invention comprises a housing having a ball inlet, a plurality of ball outlets and containing an intermediate chamber into which the ball can roll from the inlet. The intermediate chamber has a surface over which the ball can roll to one of a plurality of exits, a shutter being provided which enables one of the exits to be opened while the remaining exits are closed, the ball then rolling from each of the exits to a corresponding one of the ball outlets. The toy also comprises means for moving the shutter means so as to select one of the exit channels.

It is preferred that the shutter is a belt connected with at least one turning knob exterior to the housing which can be rotated to angular positions corresponding to the questions to be answered.

In a preferred embodiment, the housing has an inclined upper surface with the ball inlet arranged at one corner of the top end of the surface and the ball outlets arranged at the lower end of the inclined surface. A ball inlet channel having an inclined rolling surface runs along one side of the housing to receive a ball dropped in the ball inlet and to deliver the ball to the intermediate chamber, which runs across the width of the housing. The side of the intermediate chamber facing the ball outlets is defined by a belt having holes therein, each hole corresponding in position to one of the ball outlets and only one of the holes being registered with the intermediate chamber at any one time, so that the ball will leave the intermediate chamber through that hole and then roll to said corresponding outlet.

DETAILED DESCRIPTION OF THE PREFERRED EMBODIMENTS

Figure 1:
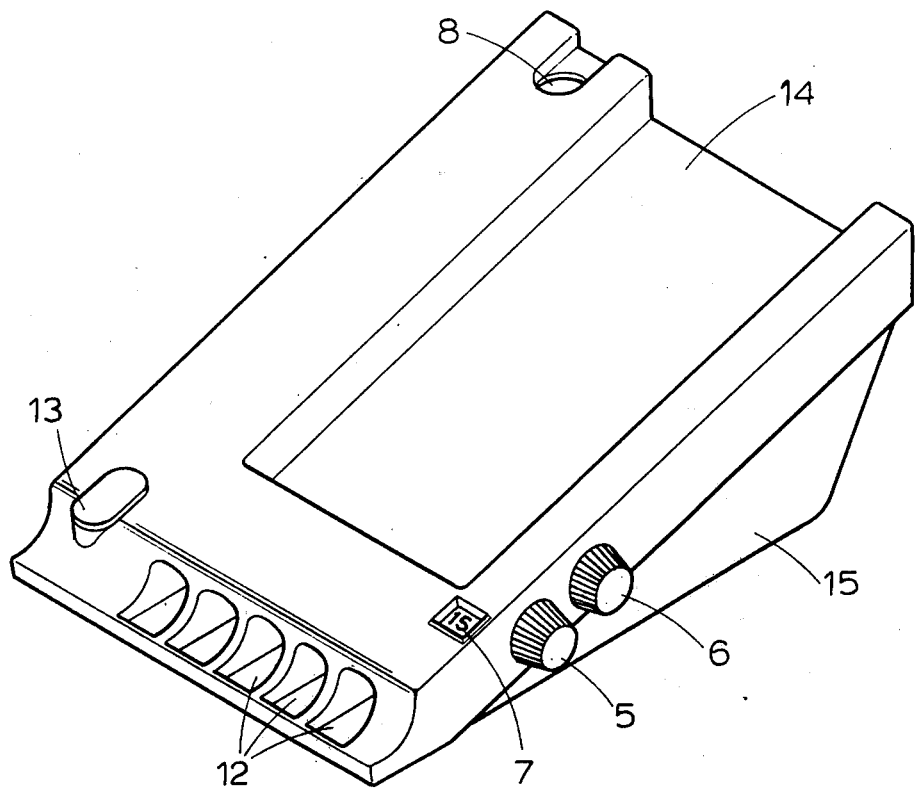
FIG. 1 is a perspective view of an embodiment of the invention.
Figure 4:
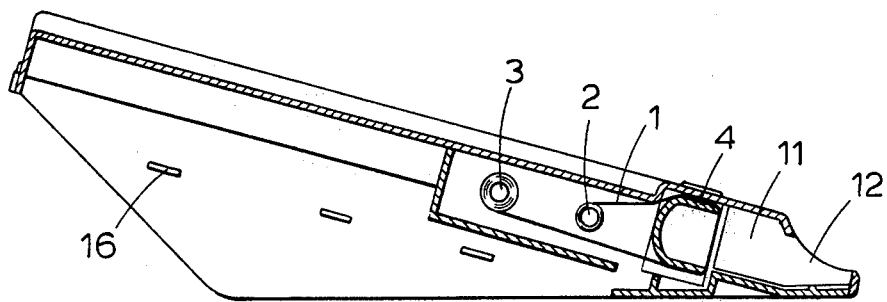
FIG. 4 is a section on line A—A of FIG. 2.
Figure 2:
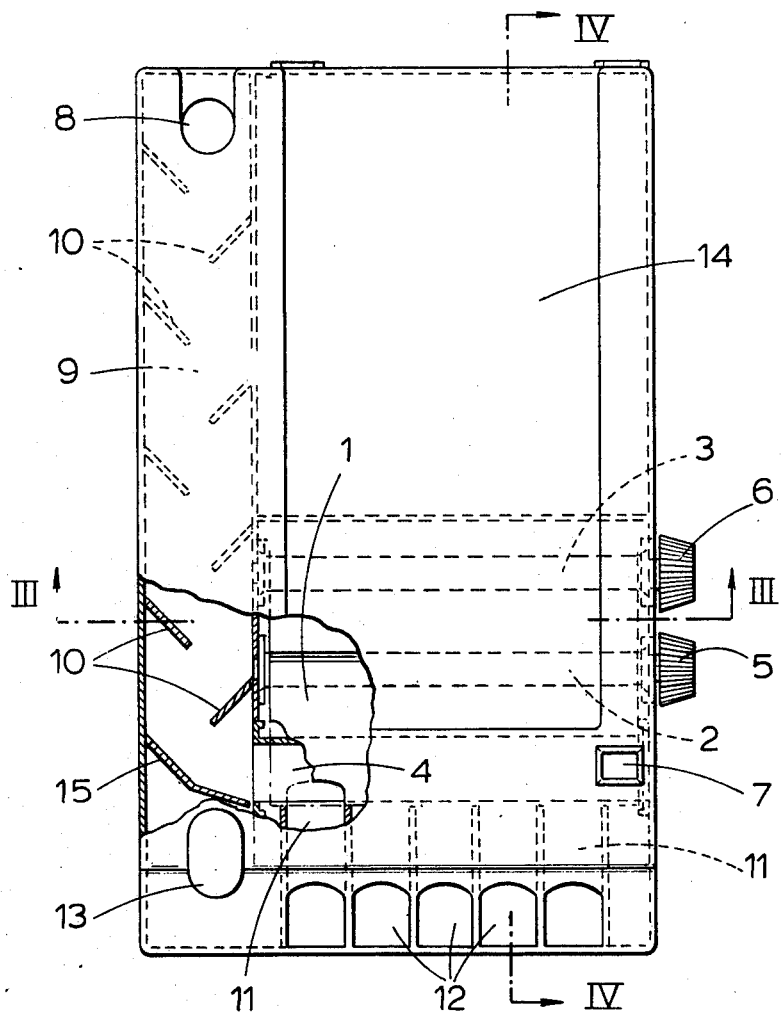
FIG. 2 is a plan view of the embodiment shown in FIG. 1.
Figure 3:
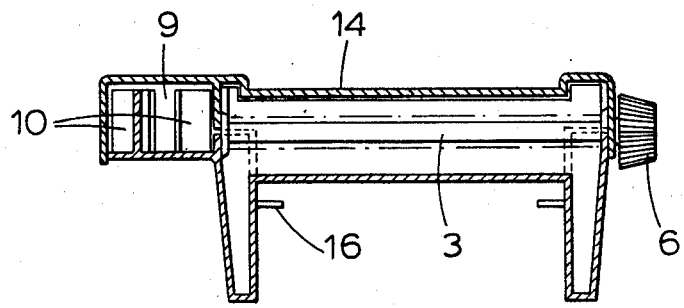
FIG. 3 is a section on line B—B of FIG. 2.

As shown in FIG. 1, a preferred embodiment of the invention comprises a ball inlet 8 and a plurality of ball outlets 12 to which a ball (not shown) can roll from the inlet. When a ball is placed in the inlet 8, it will roll down a ball inlet channel 9 running along one side of the housing. The channel is provided with an inclined rolling surface and a plurality of upright baffles 10 which are inclined with respect to the side walls of the channel, the baffles serving to delay the passage of the ball through the inlet channel. At the end of the inlet channel there is provided an upright deflecting member 15 which directs the ball into an intermediate chamber 4 having a rolling surface at least in part constituted by a belt 1 arranged inside the housing. The belt 1 is preferably made of flexible polyvinyl chloride.

Each end of the belt is connected to one of the spindles 2, 3, each of which terminates in a knurled turning knob 5, 6. The belt can be moved in either direction by turing one of the knobs 5, 6. The outer surface of the belt is provided with numbers or other markings which are visible through a window 7 in the top of the housing. The inner surface of the belt is movable over the upper and lower surfaces of the intermediate chamber 4. The front face of the intermediate chamber 4 is open, the ball being retained therein by the belt. However, the belt has a plurality of holes therethrough, each of which corresponds to one of the ball exits 11, and in any position of the belt, only one of the holes will be in the portion of the belt between the upper and lower surfaces of the intermediate chamber. The ball will therefore leave the intermediate chamber through that hole, pass down the ball exit channel 11 and appear at the ball outlet corresponding to the correct answer to a question corresponding to the number appearing in the window 7. A display recess 14, adapted to receive a sheet setting forth a plurality of questions is provided in the upper surface of the housing. Since, in the illustrated embodiment of the invention, the toy is provided with five outlets, each question is provided with five possible answers on the question sheet, spaced across the sheet to correspond to the outlets. It will be appreciated that the toy could have a larger number of outlets to enable it to deal with a correspondingly larger number of possible answers.

Then, when one of the turning knobs is rotated until the number of a particular question is visible through the window 7, an aperture in the belt communicates with the ball outlet corresponding to the correct answer to the question, whereby the belt acts as a shutter means.

The upper surface of the housing is provided with a ball retaining socket 13, closable by a removable cap, for retaining the ball when not in use. The socket can also be used to store coloured pegs having holes in one end which are adapted to fit over studs on the top surface of the housing above each of the outlets. In the preferred embodiment there are provided four studs over each outlet, thus enabling up to four people to play. There are also provided four columns of ten studs on the top surface of the housing above the ball inlet channel enabling the total scores of up to four players to be recorded.

The underside of the housing is provided with a receptacle in which question sheets are stored and held in position by means of tabs 16.

A game is played using the toy as follows:

A question sheet is selected from the back of the housing and placed in the recess 14. the knobs at the side of the machine are then turned until the number corresponding to the number of one of the questions on the sheet appears in the window 7. Each player has two pegs of the same colour and, having selected one of the answers as being correct, places one of the pegs on one of the studs corresponding to that answer. Since four studs are provided for each answer, all four players can select the same answer if they so wish. A steel ball is then inserted in the inlet and, after a few seconds, it reappears at the outlet directly below the correct answer. Each player having selected the correct answer then places his second peg on the first stud at the bottom of one column, and for every subsequent correct answer moves it up one place.

Figure 5:
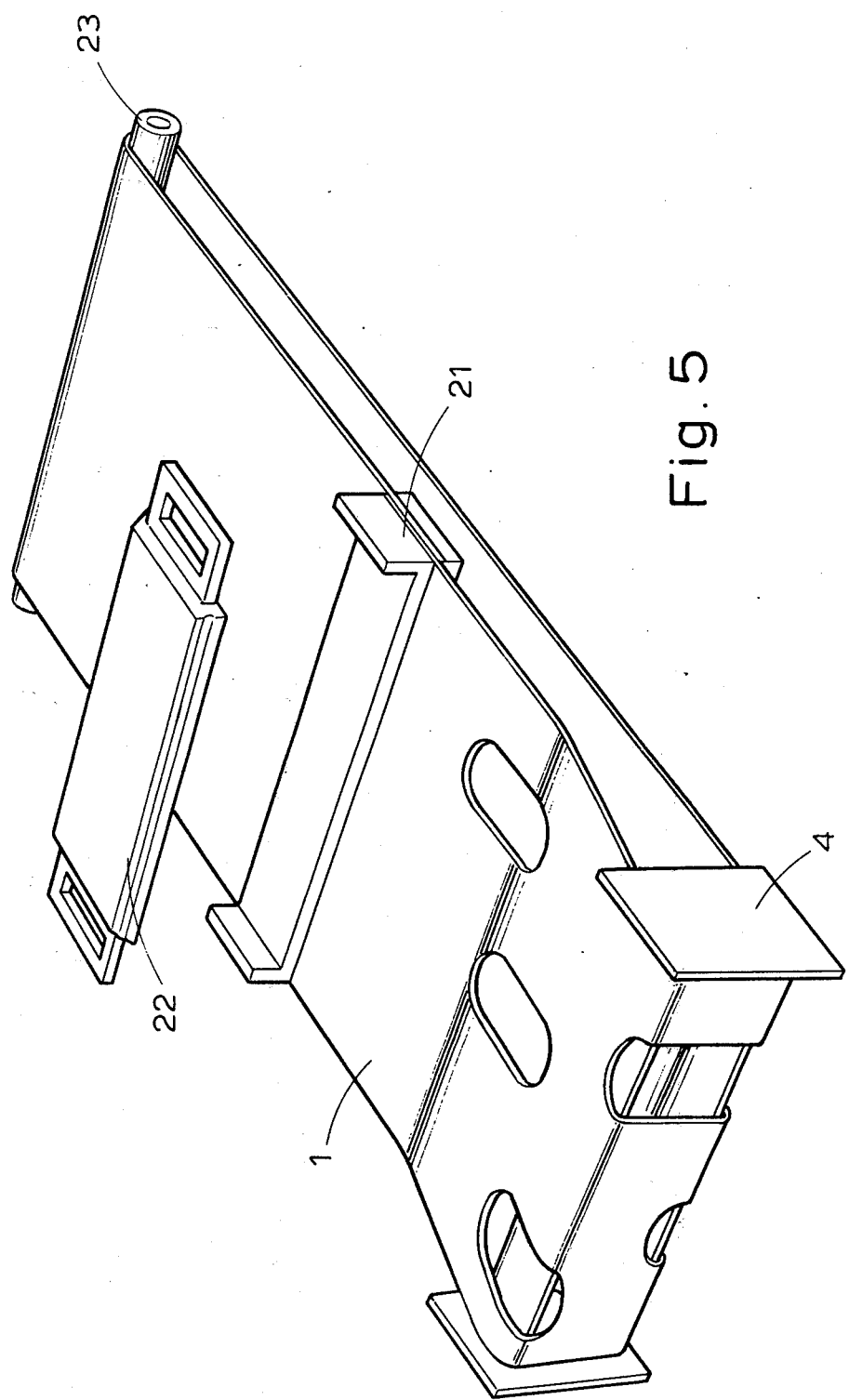
FIG. 5 shows a perspective view of the belt assembly of an alternative embodiment of the invention.

The alternative embodiment of the invention, shown in FIG. 5 of the drawings, only differs from the first preferred, embodiment in the form of the belt assembly. The intermediate chamber 4 is of similar construction as well as the parts not shown. In this embodiment, however, the belt 1 is endless and its upper run has secured thereto a slide member 21 running inside the housing. The slide 21 is connected to a cursor 22 which can move from one end to the other of the display recess 14. The top end of the belt runs over a cylindrical member 23. The belt has apertures therein arranged to register with the ball exits as described with reference to the first described embodiment.

This embodiment functions in the same way as the first embodiment with the exception that instead of the use of a number appearing in a window to identify the relevant question, the cursor serves this function.

I claim:

1. A toy for playing a question and answer game comprising a housing defining a ball inlet and a plurality of ball outlets therein, an intermediate chamber arranged in said housing, an inlet channel for guiding a ball placed in said ball inlet to said intermediate chamber, a plurality of ball exit channels, each of said exit channels being associated with one of said ball outlets, a shutter means which allows the ball to pass from said intermediate chamber to one of said exit channels while preventing the ball from entering any of the remaining exit channels and means for moving said shutter means so as to select one of said exit channels and wherein said shutter comprises a flexible belt definine a plurality of holes therethrough, each hole corresponding to one of said exit channels.

2. A toy according to claim 1, comprising a plurality of baffles arranged in said inlet channel so as to slow the passage of the ball therethrough.

3. A toy according to claim 1, wherein said means for moving said shutter means comprises two spindles, one attached to each end of said flexible belt, each spindle having a turning knob on one end thereof.

4. A toy according to claim 3, wherein said housing is provided with a window therein and said belt bears a plurality of indicia, said indicia being visible through said window.

5. A toy according to claim 1, wherein said flexible belt is endless and further comprising a cursor attached to said belt for identifying a particular question.

6. A toy for playing a question and answer game, comprising a housing having a ball inlet therein at the upper end thereof and a plurality of ball outlets at the lower end thereof, an intermediate chamber arranged in said housing, an inlet channel arranged along one side of said housing for guiding a ball placed in said ball inlet to said intermediate chamber, a plurality of baffle means arranged in said inlet channel, a plurality of exit channels, each of said exit channels being associated with one of said outlets, a flexible belt having a plurality of ball passageways therethrough, each passageway corresponding to one of said exit channels, and two spindles within the housing, attached to opposite ends of said flexible belt, each spindle including a turning knob on an end thereof external to said housing, whereby a ball passageway can be shifted selectively into communication with an exit channel.

7. A toy according to claim 6, wherein said housing upper surface defines a window therein, and wherein said belt bear a plurality of indicia, said indicia being visible through said window.

* * * * *